M. D. KING.
Tire-Upsetting Machines.
No. 148,070.        Patented March 3, 1874.
*Fig. 1.*
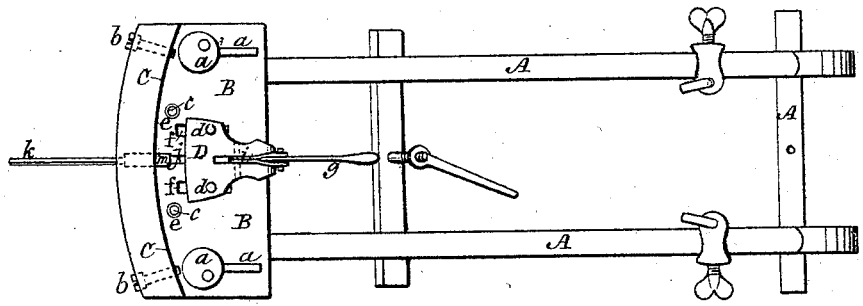
*Fig. 2.*
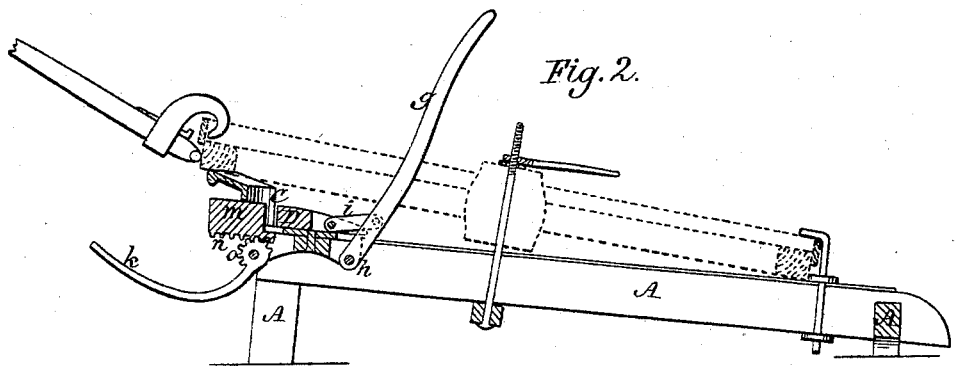
*Fig. 3.*     *Fig. 4.*     *Fig. 5.*
  
*Fig. 6.*
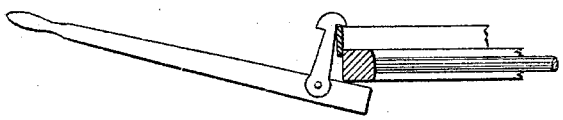
Witnesses.                      Inventor.
D. P. Cowl                       Marquis D. King.
H. S. Miller                   By atty. A. B. Stoughton.

UNITED STATES PATENT OFFICE.

MARQUIS D. KING, OF KING'S FERRY, NEW YORK, ASSIGNOR TO HIMSELF AND SENECA G. POMEROY, OF SAME PLACE.

IMPROVEMENT IN TIRE-UPSETTING MACHINES.

Specification forming part of Letters Patent No. 148,070, dated March 3, 1874; application filed November 18, 1873.

*To all whom it may concern:*

Be it known that I, MARQUIS D. KING, of King's Ferry, in the county of Cayuga and State of New York, have invented certain new and useful Improvements in Tire Upsetting or Shrinking Machines; and that the following is a full, clear, and exact description of the same, reference being had to the accompanying drawings, making a part of this specification, in which—

Figure 1 represents a top plan of the upsetting-machine, and Fig. 2 represents a sectional side elevation of the same. Figs. 3, 4, 5, and 6 represent certain tools or instruments for setting the cold tire upon the wheel, and are illustrated for the purpose of showing the whole operation of upsetting or shrinking and setting the tire upon the wheels, said tools or instruments constituting the subject-matter of a separate application for Letters Patent of even date herewith.

This invention relates to a machine for upsetting or shrinking tires in a cold state; and consists, first, in combining, with the stationary flanged head-plate and the movable former, stationary pins with movable sleeves or bosses upon them, whereby thin steel or iron tires may be kinked and upset in a cold state; and the invention further consists in combining with the head-plate and former, as above mentioned, a set-block with a rack attached, and a pinion-lever working in said rack to set back the kink against the former.

To enable others skilled in the art to make and use my invention, I will proceed to describe the same with reference to the drawings.

To one end of the frame or bed A is permanently fastened the head-plate B, which has at its outer portion a curved projection or flange, C. At both sides of the head-plate there are arranged cam-levers *a a*, and through the upwardly-extending flange or curved projection set-screws *b b* are passed, pointing toward the cams of the levers *a a*, and radial to the curve of the flange C. On the head-plate there are also arranged two stationary pins, *c c*, on each of which there is a sleeve or boss, *e*, which can turn on its pin. The former D lies and moves upon the head-plate, and is held thereto by set-screws *d d*, or equivalent device, which pass through slots *f f* in the head-plate, and thence into the former. A lever, *g*, is pivoted to the head-plate, as at *h*, and is connected to the former D by a link, *i*, so that the former can be moved with great force by said lever *g*; and the front of the former is made convex, so as to match the concave curvature of the flange C. The head-plate and its vertical flange is slotted at the center, as at *j*, for the reception of the set-block *m*, which has a rack, *n*, formed on its under side, and the sides of the set-block may also be grooved, so as to move upon ways or guides on the head-plate, to prevent it from cramping or binding. A curved lever, *k*, is pivoted to the head-plate, and has upon its hub a toothed segment, *o*, which works in the rack *n*, and so moves the set-block *m*.

The tire that is to be upset or shrunk in circumference is placed against the concave vertical flange of the head-plate, and between said flange and the bossed or roller pins *c e*. The kink or set plate *m* is then brought up against the outer perimeter of the tire, and a kink or inward bend made in it. This done, the tire is then rigidly clamped to the flange C by the cams and cam-levers *a a*, so that it cannot move circumferentially between these clamped points. The former D is then brought up against the inner perimeter of the tire, and the bend or kink therein, and the kinked portion forced out against the flange to its original curved form, and, as the tire cannot move beyond its clamped points, the excess of length or metal is driven into the confined portion of the tire, and so contracts it by upsetting the fiber of the metal.

I use this same frame or bed A for holding and adjusting the wheel while the upset tire is forced upon it, and have shown in Fig. 2, in dotted lines, the wheel so placed and held, and in said Fig. 2, and in Figs. 3, 4, 5, and 6, have shown certain tools or instruments by which the setting of the tire upon the wheel is accomplished; but as the setting of the shrunken tire upon the wheel has been heretofore adjudged to be the subject-matter of a separate application for a patent, I have, in conformity with such judgment, made these appliances and instrumentalities the subject-matter of a separate application for a patent, and, having shown them in the drawings, do not in this application further describe them.

The bossed or roller pins $c\,e$ are so arranged on the head-plate, and in relation to the kink-block $m$, as that the inward bend or kink in the tire shall be directly opposite the convex face of the former D, and so that the former will just pass between them. This is important in any tire, but particularly with thin steel or iron tires.

The within-described invention is an improvement upon that patented to me on the 31st December, 1872, No. 134,384.

Having thus fully described my invention, what I claim herein as new, and desire to secure by Letters Patent, is—

1. In combination with the head-plate B and kinking or set block $m$, the bossed or roller pins $c\,e$, for holding the tire and defining the extent of the bend or kink, as described and represented.

2. In combination with the head-plate and its vertical flange C and bossed pins $c\,e$, the kink-block $m$, with its rack $n$, and the bent lever $k$, with its cogged segment $o$, as and for the purpose described and represented.

MARQUIS D. KING.

Witnesses:
L. B. KING,
E. P. SHAW.